US010220369B2

(12) United States Patent
Mimna et al.

(10) Patent No.: US 10,220,369 B2
(45) Date of Patent: Mar. 5, 2019

(54) ENHANCED SORBENT FORMULATION FOR REMOVAL OF MERCURY FROM FLUE GAS

(71) Applicant: Calgon Carbon Corporation, Moon Township, PA (US)

(72) Inventors: Richard A. Mimna, Oakdale, PA (US); Walter G. Tramposch, Moon Township, PA (US)

(73) Assignee: CALGON CARBON CORPORATION, Moon Township, PA (US)

(*) Notice: Subject to any disclaimer, the term of this patent is extended or adjusted under 35 U.S.C. 154(b) by 0 days.

(21) Appl. No.: 15/223,681

(22) Filed: Jul. 29, 2016

(65) Prior Publication Data
US 2017/0056853 A1 Mar. 2, 2017

Related U.S. Application Data

(60) Provisional application No. 62/203,685, filed on Aug. 11, 2015.

(51) Int. Cl.
| B01D 53/64 | (2006.01) |
| B01D 53/82 | (2006.01) |
| B01J 20/20 | (2006.01) |
| B01J 20/02 | (2006.01) |
| B01D 53/04 | (2006.01) |

(52) U.S. Cl.
CPC ............ *B01J 20/20* (2013.01); *B01D 53/04* (2013.01); *B01D 53/64* (2013.01); *B01D 53/82* (2013.01); *B01J 20/02* (2013.01); *B01D 2251/206* (2013.01); *B01D 2251/61* (2013.01); *B01D 2253/102* (2013.01); *B01D 2257/602* (2013.01)

(58) Field of Classification Search
None
See application file for complete search history.

(56) References Cited

U.S. PATENT DOCUMENTS

| 1,519,470 A | 12/1924 | Wilson et al. |
| 1,984,164 A | 12/1934 | Stock et al. |
| 3,194,629 A | 7/1965 | Dreibelbis et al. |
| 3,755,193 A | 8/1973 | Luft et al. |
| 3,833,498 A | 9/1974 | Stahfeld |
| 3,909,449 A | 9/1975 | Nagai et al. |
| 3,926,590 A | 12/1975 | Aibe et al. |
| 3,961,020 A | 6/1976 | Seki |
| 4,174,373 A | 11/1979 | Yoshida et al. |
| 4,196,173 A | 4/1980 | deJong et al. |
| 4,215,096 A | 7/1980 | Sinha et al. |
| 4,453,978 A | 6/1984 | Okimura et al. |
| 4,491,609 A | 1/1985 | Degel et al. |
| 4,500,327 A | 2/1985 | Nishino et al. |
| 4,532,115 A | 7/1985 | Nishino et al. |
| 4,578,256 A | 3/1986 | Nishino et al. |
| 4,708,853 A | 11/1987 | Matviya et al. |
| 4,772,455 A | 9/1988 | Izumi et al. |
| 4,812,291 A | 3/1989 | Friemel et al. |
| 4,828,619 A | 5/1989 | Matsushita et al. |
| 5,019,162 A | 5/1991 | Suzuki et al. |
| 5,064,805 A | 11/1991 | Otowa |
| 5,110,362 A | 5/1992 | Hoarty et al. |
| 5,187,141 A | 2/1993 | Jhu et al. |
| 5,245,106 A | 9/1993 | Cameron et al. |
| 5,286,292 A | 2/1994 | Tsukada et al. |
| 5,336,835 A | 8/1994 | McNamara |
| 5,352,370 A | 10/1994 | Hayden |
| 5,435,980 A | 7/1995 | Felsvang et al. |
| 5,654,352 A | 8/1997 | MacDonald |
| 5,658,547 A | 8/1997 | Michalak et al. |
| 5,674,462 A | 10/1997 | Hayden et al. |
| 5,695,726 A | 12/1997 | Lerner |
| 5,726,118 A | 3/1998 | Ivey et al. |
| 6,126,910 A | 10/2000 | Wilhelm et al. |
| 6,238,641 B1 | 5/2001 | Hayden |
| 6,514,906 B1 | 2/2003 | Hayden |
| 6,521,037 B1 | 2/2003 | Hurt et al. |
| 6,589,318 B2 | 7/2003 | El-Shoubary et al. |
| 6,638,347 B2 | 10/2003 | El-Shoubary et al. |
| 6,706,111 B1 | 3/2004 | Young |
| 6,719,828 B1 | 4/2004 | Lovell et al. |
| 6,783,585 B2 | 8/2004 | Zacarias et al. |
| 6,803,025 B2 | 10/2004 | Meserole et al. |
| 6,808,692 B2 | 10/2004 | Oehr |
| 6,818,043 B1 | 11/2004 | Chang et al. |
| 6,848,374 B2 | 2/2005 | Srinivasachar et al. |
| 6,878,358 B2 | 4/2005 | Vosteen et al. |
| 6,890,507 B2 | 5/2005 | Chen et al. |

(Continued)

FOREIGN PATENT DOCUMENTS

| CA | 2036746 A1 | 2/1992 |
| CN | 1388060 A | 1/2003 |

(Continued)

OTHER PUBLICATIONS

Albemarle Corporation Website, "B-PAC™ High Performance Mercury Sorbent" Jan. 1, 2004, retrieved from internet May 16, 2014 at https://www.albermarle.com.

Bittner et al., "Triboelectrostatic Fly Ash Beneficiation: An Update on Separation Technologies," International Operations, pp. 1-69.

Campbell et al., "Mercury Control with Activated Carbon: Results from Plants with High SO.sub.3," Paper #08-A-174-Mega-AWMA, pp. 1-17; Proceedings from the2008 Power Plant Pollution Control "Mega" Symposium, Aug. 25-28, 2008, Baltimore, Maryland.

Colabella et al., "The Absorption and Subsequent Oxidation of AsH, and PH on Activated Carbon," *J. of Crystal Growth* (Oct. 1988), 92(1-2):189-195.

Dombrowski, "Evaluation of Low Ash Impact Sorbent Injection Technologies at a Texas Lignite/PRB Fired Power Plant," URS Corporation, pp. 1-27.

(Continued)

*Primary Examiner* — Sheng H Davis
(74) *Attorney, Agent, or Firm* — Pepper Hamilton LLP

(57) ABSTRACT

A mercury sorbent and method for enhancing mercury removal performance of activated carbon from flue gas by the addition of non-halogen ammonium-containing compounds are provided herein.

21 Claims, 1 Drawing Sheet

(56) References Cited

U.S. PATENT DOCUMENTS

| | | |
|---|---|---|
| 6,953,494 B2 | 10/2005 | Nelson, Jr. |
| 6,960,329 B2 | 11/2005 | Sellakumar |
| 7,273,524 B2 | 9/2007 | Tomita et al. |
| 7,404,940 B2 | 7/2008 | Higgins et al. |
| 7,435,286 B2 | 10/2008 | Olson et al. |
| 7,442,352 B2 | 10/2008 | Lu et al. |
| 7,514,052 B2 | 4/2009 | Lissianski et al. |
| 7,722,843 B1 | 5/2010 | Srinivasachar |
| 8,057,576 B1 | 11/2011 | Pollack |
| 8,080,088 B1* | 12/2011 | Srinivasachar ........ B01D 53/02 502/417 |
| 8,168,147 B2 | 5/2012 | Olson et al. |
| 8,216,535 B2 | 7/2012 | Pollack et al. |
| 8,309,046 B2 | 11/2012 | Pollack et al. |
| 8,409,330 B2 | 4/2013 | Pollack |
| 8,450,238 B2 | 5/2013 | Pollack et al. |
| 8,551,431 B1* | 10/2013 | Adams ................... B01D 53/64 423/210 |
| 8,679,430 B2 | 3/2014 | Pollack et al. |
| 8,715,599 B2 | 5/2014 | Pollack et al. |
| 8,834,606 B2 | 9/2014 | Pollack |
| 9,068,745 B2 | 6/2015 | Pollack et al. |
| 9,308,518 B2 | 4/2016 | Mimna et al. |
| 9,321,032 B1 | 4/2016 | Pollack et al. |
| 2003/0206843 A1 | 11/2003 | Nelson |
| 2004/0003716 A1 | 1/2004 | Nelson |
| 2004/0013589 A1 | 1/2004 | Vosteen et al. |
| 2004/0069186 A1 | 4/2004 | Zacarias et al. |
| 2004/0074391 A1 | 4/2004 | Durante et al. |
| 2004/0144287 A1 | 7/2004 | Tardif et al. |
| 2004/0200389 A1 | 10/2004 | Young |
| 2004/0206276 A1 | 10/2004 | Hill et al. |
| 2004/0220046 A1 | 11/2004 | Stockwell et al. |
| 2004/0244657 A1 | 12/2004 | Srinivasachar et al. |
| 2005/0019240 A1 | 1/2005 | Lu et al. |
| 2005/0039598 A1 | 2/2005 | Srinivasachar et al. |
| 2005/0147549 A1 | 7/2005 | Lissianski et al. |
| 2006/0048646 A1 | 3/2006 | Olson et al. |
| 2006/0051270 A1 | 3/2006 | Brunette |
| 2006/0090646 A1 | 5/2006 | Sawada et al. |
| 2006/0193763 A1 | 8/2006 | Cross et al. |
| 2006/0204418 A1 | 9/2006 | Chao et al. |
| 2006/0205592 A1 | 9/2006 | Chao et al. |
| 2006/0255494 A1 | 11/2006 | Ohtomo et al. |
| 2007/0041885 A1 | 2/2007 | Maziuk |
| 2007/0056479 A1 | 3/2007 | Gray |
| 2007/0056481 A1 | 3/2007 | Gray |
| 2007/0122327 A1 | 5/2007 | Yang et al. |
| 2007/0140941 A1 | 6/2007 | Comrie |
| 2007/0180990 A1 | 8/2007 | Downs et al. |
| 2007/0207923 A1 | 9/2007 | Lu et al. |
| 2007/0219404 A1 | 9/2007 | Matthews |
| 2007/0231230 A1 | 10/2007 | Meserole et al. |
| 2007/0234902 A1 | 10/2007 | Fair et al. |
| 2008/0134888 A1 | 6/2008 | Chao et al. |
| 2008/0182747 A1 | 7/2008 | Sinha |
| 2008/0207443 A1 | 8/2008 | Gadkaree et al. |
| 2008/0274874 A1 | 11/2008 | Heschel et al. |
| 2009/0007785 A1 | 1/2009 | Kimura et al. |
| 2009/0010828 A1 | 1/2009 | Holmes et al. |
| 2009/0056538 A1 | 3/2009 | Srinivasachar et al. |
| 2009/0081092 A1 | 3/2009 | Yang et al. |
| 2009/0136401 A1 | 5/2009 | Yang et al. |
| 2009/0235848 A1 | 9/2009 | Eiteneer et al. |
| 2010/0018395 A1 | 1/2010 | Srinivasachar et al. |
| 2010/0025302 A1 | 2/2010 | Sato et al. |
| 2011/0048231 A1 | 3/2011 | Sinha |
| 2011/0195003 A1* | 8/2011 | Durham ................. B01D 53/64 423/210 |
| 2011/0250110 A1 | 10/2011 | Keiser et al. |
| 2012/0085708 A1 | 4/2012 | Redding |
| 2012/0100053 A1 | 4/2012 | Durham et al. |
| 2012/0183458 A1 | 7/2012 | Olson et al. |
| 2012/0244355 A1* | 9/2012 | Pollack ................. B01D 53/64 428/402 |
| 2013/0330257 A1 | 12/2013 | Tramposch |
| 2016/0102019 A1 | 4/2016 | Pollack et al. |
| 2017/0080402 A1 | 3/2017 | Tramposch et al. |

FOREIGN PATENT DOCUMENTS

| | | |
|---|---|---|
| DE | 588531 C | 11/1993 |
| DE | 2517378 A1 | 10/1996 |
| DE | 102007020422 A1 | 10/2008 |
| EP | 0289809 A1 | 11/1988 |
| EP | 2858747 A1 | 4/2015 |
| JP | 58020224 A | 2/1983 |
| JP | 61118117 A | 6/1986 |
| JP | 62213822 A | 9/1987 |
| JP | H08178240 A | 7/1996 |
| JP | 2000038589 A | 2/2000 |
| JP | 2002331273 A | 11/2002 |
| JP | 2003038415 | 2/2003 |
| JP | 4953591 B2 | 6/2012 |
| JP | 4953592 B2 | 6/2012 |
| JP | 2013085360 | 11/2015 |
| WO | WO 1993008902 A1 | 5/1993 |
| WO | 2000069991 A1 | 11/2000 |
| WO | 2001085307 A1 | 11/2001 |
| WO | WO 2001085307 A1 | 11/2001 |
| WO | WO 2003093518 A1 | 11/2003 |
| WO | WO 2005092476 A1 | 10/2005 |
| WO | WO 2006039007 A2 | 4/2006 |
| WO | WO 2006101499 A1 | 9/2006 |
| WO | WO 2007112248 A2 | 10/2007 |
| WO | WO 2008064360 A2 | 5/2008 |
| WO | WO 2008143074 A1 | 11/2008 |
| WO | WO 2011038415 A2 | 3/2011 |
| WO | WO 2011127323 A2 | 10/2011 |
| WO | WO 2012030560 A1 | 3/2012 |
| WO | WO 2013188327 A1 | 12/2013 |
| WO | WO 2014126749 A1 | 8/2014 |

OTHER PUBLICATIONS

Feng et al., "Environmental Function Material," *Chemical Industry Press*, p. 136 (translation).

Ghorishi et al., "An Experimental Study of Mercury Sorption by Activated Carbons and Calcium Hydroxide," EPA Office of Research and Development, Air Pollution Prevention & Control Division, North Carolina pp. 1-17 (1998).

Gleiser et al., "Control of Mercury from MSW Combustors by Spray Dryer Absorption Systems and Activated Carbon Injection," Proceedings of an International Specialty Conference, Williamsburg, Virginia, Mar. 1993, pp. 1-15.

Granite et al., "Novel Sorbents for Mercury Removal from Flue Gas," *Indus. & Engin. Chem. Res.* (Apr. 2000), 39(4):1020-1029.

Hall et al., "Sorption of Phosphine by Activated Carbon Cloth and the Effects of Impregnation with Silver and Copper Nitrates and the Presence of Water" *Carbon* (1985), 23(4):353-371.

Hurt et al., "Strategies and Technology for Managing High-Carbon Ash" Brown University and University of Utah (Sep. 1, 2002-Feb. 28, 2003) pp. 1-13.

International Search Report and Written Opinion for PC T/US2014/014605 dated May 22, 2014.

International Search Report and Written Opinion for PCT/US2007/064579 dated Oct. 25, 2007.

International Search Report and Written Opinion for PCT/US2010050598 dated Jun. 27, 2011.

International Search Report and Written Opinion for PCT/US2011/01638 dated Dec. 28, 2011.

International Search Report and Written Opinion for PCT/US2013/045061 dated Oct. 11, 2013.

Japanese Office Action from counterpart application JP 2012-532246 dated Nov. 19, 2013.

Jarvis et al., $SO_3$ Removal as a Mercury Control Strategy: Reducing $SO_3$ helps control mercury emissions and can boost plant efficiency and decrease operating costs, *Power Industry Services* (2008), 1-9.

(56) References Cited

OTHER PUBLICATIONS

Laflesh et al., "Progress Report on Mercury Control Retrofit at the Colstrip Power Station, Paper #91," Aug. 30-Sep. 2, 2010, Presented at A&WMA's Power Plant Air Pollutant Control MEGA Symposium in Baltimore, MD, 1-23.
Laine et al., "Effect of the preparation method on the pore size distribution of activated carbon from coconut shell," *Carbon* (1992), 30(4):601-604.
Lee et al., "Gas Phase Mercury Removal by Carbon-Based Sorbents," *Fuel Processing Tech.* (2003), 84:197-206.
Li et al., "Mercury Emissions Control in Coal Combustion Systems Using Potassium Iodide: Bench-Scale and Pilot-Scale Studies," *Energy & Fuels* (Jan. 5, 2009), 23:236-243.
Looney et al., "Activated Carbon Injection with $SO_3$ Flue Gas Conditioning Test at Gulf Power's Mercury Research Center," Paper #78, pp. 1-7; Proceedings from the 2008 Power Plant Pollution Control "Mega" Symposium, Aug. 25-28, 2008, Baltimore, Maryland.
Lou et al. "Stability of Mercury on Three Activated Carbon Sorbents" *Fuel Processing Tech.* (2006), 87:679-685.
Macias-Perez et al., "$SO_2$ retention on CaO/activated carbon sorbents. Part II: Effect of the activated carbon support," *Fuel* (Feb. 20, 2008), 87(12):2544-2550.
Mullett et al., "Removal of Elemental Mercury from Bayer Stack Gases Using Sulfur-Impregnated Activated Carbons," *Chem. Eng. J.* (2012), pp. 133-142.
Muthu et al., "An Evaluation of Impregnated Respirator Canister Carbons for Phosphine Removal from Air," *Pestic. Sci.* (1974), 5:245-249.
Nelson Jr. et al., "Accumulated Power-Plant Mercury-Removal Experience with Brominated PAC Injection Paper #95," Aug. 30, 2004, Retrieved from Internet on May 15, 2014 at URL:http://www.netl.doe.gov/FileLibrary/Research/Coal/ewr/mercury/Mega2-4-1990.pdf.
Office Action for corresponding Japanese Patent Application No. 2013-503964 dated May 27, 2014.
Office of Inspector General, Evaluation Report: Additional Analyses of Mercury Emissions Needed Before EPA Finalizes Rules for Coal-Fired Electric Utilities, Report No. 2005-P-00003, Feb. 3, 2005, pp. 1-54.
Paradis, "Impact of Mercury Sorbents on Fly Ash Use for Cement Replacement" Paper #164, URS Corporation, pp. 1-120.
Pollack, "Sorbent Injection: Taking the Technology from R&D to Commercial Launch," Paper #188, Calgon Carbon Corporation, p. 1-24.
Presto et al., "Further Investigation of the Impact of Sulfur Oxides on Mercury Capture by Activated Carbon," *Ind. Eng. Chem. Res.* (Nov. 2, 2007), 46(24):8273-8276.
Presto et al., "Impact of Sulfur Oxides on Mercury Capture by Activated Carbon," *Environ Sci Technol.* (Sep. 15, 2007), 41(18):6579-6584.
Sontheimer et al., "Evaluation Methods Utilizing Aqueous Solutions, in Activated Carbon for Water Treatment," 1988, p. 100-103.
Strivastava et al., "Control of Mercury Emissions from Coal-Fired Electric Utility Boilers," Mar. 1, 2006, Retrieved from Internet on May 15, 2014 at URL:http://pubs.acs.org/doi/pdf/10.1021/es062639u.
Strivastava, "Control of Mercury Emissions from Coal Fired Electric Utility Boilers: An Update," Feb. 2010, Retrieved from Internet on May 16, 2014 at URL:http://nepis.epa.gov/Adobe/PDF/P1006LCB.pdf.
Supplementary European Search Report for corresponding European Patent Application No. 11 76 6760 dated May 21, 2014.
Supplementary European Search Report and Written Opinion for EP 10819662 dated Feb. 26, 2013.
Supplementary European Search Report and Written Opinion for EP 14751874 dated Sep. 12, 2016.
Supplementary European Search Report and Written Opinion for EP 13804633 dated Feb. 1, 2016.
U.S. Environmental Protection Agency, Case Study 11: Ash Fuel Reburn and Beneficiation at We Energies (Dec. 2003).
Uddin et al., "Rose of SO2 for Elemental Mercury Removal from Coal Combustion Flue Gass by Activated Carbon," *Energy & Fuels* (2008), 22(4):2284-2289.
White et al., "Parametric Evaluation of Powdered Activated Carbon Injection for Control of Mercury Emissions from a Municipal Waste Combustor," Paper No. 92-40.06, 1992 Annual Meeting, Air and Waste Management Association, Kansas City, Missouri, Jun. 1992.
Wirling, "Process Optimisation of Quasi-Dry Waste Gas Cleaning with Integrated Dioxin and Furan Adsorption," (Sep. 2001) Presented at Pollutant Control Symposium—Solutions in Dioxin and Mercury Reduction, University of Alicante 1-13.
Wirling, "Sicherheitstechnische Aspekte bei der Anwendung von kohlenstoffhaltigen Sorbentien zur Flugstromadsorption," (2006) Technik + Trends 126(6):47-54 (translated title—Safety Aspects in the Use of Carbonaceous Sorbents for Entrained-Phase Adsorption).
Yan et al., "Bench-Scale Experimental Evaluation of Carbon Performance on Mercury Vapour Adsorption," *Fuel* (2004), 83:2401-2409.
Boehm et al. "Activation of Carbon Catalysts for Oxidation Reactions . . . " Journal de Chimie Physique 84:1449-1455 (1987). (Abstract).
Database WPI Week 197450, Dement Pubiications Ltd., London, GB: AN 1974-86197V, XP002454207.
Database WPI8 Week 197450, Derwent Publications Ltd., London, GB; AN 1974-86198V, XP002454206.
Wang et al. "An Appraisal of the Surface Chemistry and Catalytic Oxidative Activity of the Nitrogen-Modified Activated Carbon by XPS" Cuihva Xuebao, 10(4):357-364 (1989) (Abstract).
Anonymous: "Activated carbon—Wikipedia", Aug. 7 Retrieved from the Internet: URL:https://en.wikipedia.org/wiki/Activated_carbon[retrieved on Aug. 7, 2018].
European Patent Application No. 13804633.9 Office Action dated Aug. 13, 2018.

\* cited by examiner

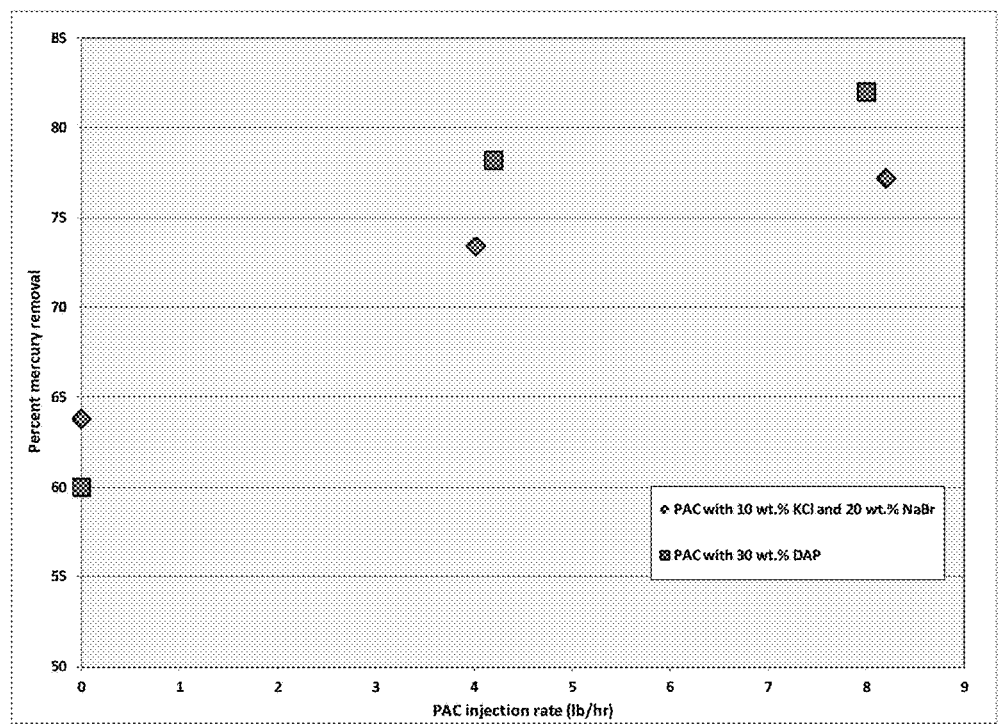

ENHANCED SORBENT FORMULATION FOR REMOVAL OF MERCURY FROM FLUE GAS

CROSS-REFERENCE TO RELATED APPLICATIONS

This application claims priority from U.S. Provisional No. 62/203,685 entitled "Enhanced Sorbent Formulation for Removal of Mercury from Flue Gas", filed Aug. 11, 2015, the contents of which are hereby incorporated by reference in its entirety.

GOVERNMENT INTERESTS

Not applicable

PARTIES TO A JOINT RESEARCH AGREEMENT

Not applicable

INCORPORATION BY REFERENCE OF MATERIAL SUBMITTED ON A COMPACT DISC

Not applicable

BACKGROUND

Mercury is a known environmental hazard and leads to health problems for both humans and non-human animal species. Approximately 50 tons per year are released into the atmosphere in the United States, and a significant fraction of the release comes from emissions from coal burning facilities such as electric utilities. To safeguard the health of the public and to protect the environment, the utility industry is continuing to develop, test, and implement systems to reduce the level of mercury emissions from its plants. In the combustion of carbonaceous materials, it is desirable to have a process wherein mercury and other undesirable compounds are captured and retained after the combustion phase so that they are not released into the atmosphere.

One of the most promising solutions for mercury removal from flue gas is Activated Carbon Injection (ACI). Activated carbon is a highly porous, non-toxic, readily available material that has a high affinity for mercury vapor. This technology is already established for use with municipal incinerators. Although the ACI technology is effective for mercury removal, the short contact time between the activated carbon and the flue gas stream results in an inefficient use of the full adsorption capacity of the activated carbon. Mercury is adsorbed while the carbon is conveyed in the flue gas stream along with fly ash from the boiler. The carbon and fly ash are then removed by a particulate capture device such as an Electrostatic Precipitator (ESP), baghouse filters, or wet scrubbers.

SUMMARY OF THE INVENTION

Various embodiments of the invention are directed to a mercury sorbent including an adsorptive material and a non-halogen ammonium-containing compound. In some embodiments, the non-halogen ammonium-containing compound may be ammonium bicarbonate salts, ammonium phosphate salts, mixed salt ammonium phosphates, ammonium pyrophosphates, hydrogen ammonium phosphates, dihydrogen ammonium phosphates, urea-phosphate, urea, and combinations thereof. In certain embodiments, the mercury sorbent may include about 1 wt. % to about 20 wt. % non-halogen ammonium-containing compound based on the total weight of the mercury sorbent. In various embodiments, the adsorptive material may be carbonaceous char, activated carbon, carbon black, reactivated carbon, zeolite, silica, silica gel, alumina clay, or combinations thereof, and in some embodiments, the mercury sorbent may have a mean particle diameter of about 1 µm to about 30 µm. In particular embodiments, the mercury sorbent may further include an alkaline additive, and in some embodiments, the alkaline additive may be calcium carbonate, calcium oxide, calcium hydroxide; magnesium carbonate, magnesium hydroxide, magnesium oxide, sodium carbonate, sodium bicarbonate, trisodium hydrogendicarbonate dihydrate, or combinations thereof.

Further embodiments are directed to methods for removing mercury from flue gas including the steps of injecting a mercury sorbent including an adsorptive material and a non-halogen ammonium-containing compound into the flue gas. In some embodiments, the non-halogen ammonium-containing compound may be ammonium bicarbonate salts, ammonium phosphate salts, mixed salt ammonium phosphates, ammonium pyrophosphates, hydrogen ammonium phosphates, dihydrogen ammonium phosphates, urea-phosphate, urea, and combinations thereof. In certain embodiments, the mercury sorbent may include about 1 wt. % to about 20 wt. % non-halogen ammonium-containing compound based on the total weight of the mercury sorbent. In various embodiments, the adsorptive material may be carbonaceous char, activated carbon, carbon black, reactivated carbon, zeolite, silica, silica gel, alumina clay, or combinations thereof, and in some embodiments, the mercury sorbent may have a mean particle diameter of about 1 µm to about 30 µm. In particular embodiments, the mercury sorbent may further include an alkaline additive, and in some embodiments, the alkaline additive may be calcium carbonate, calcium oxide, calcium hydroxide; magnesium carbonate, magnesium hydroxide, magnesium oxide, sodium carbonate, sodium bicarbonate, trisodium hydrogendicarbonate dihydrate, or combinations thereof. In some embodiments, the adsorptive material and non-halogen ammonium-containing compound can be injected simultaneously, and in other embodiments, the adsorptive material and non-halogen ammonium-containing compound can be injected individually. In certain embodiments, the adsorptive material is injected upstream of the air preheater. In some embodiments, the non-halogen ammonium-containing compound can be injected upstream of the air preheater, and in other embodiments, the non-halogen ammonium-containing can be injected compound downstream of the air preheater.

DESCRIPTION OF DRAWINGS

FIG. 1 shows a plot of percent mercury removal versus the injection rate of mercury adsorbents containing powdered activated carbon (PAC), 10 wt. % KCl, and 20 wt. % NaBr (♦) and PAC with 30 wt. % diammonium phosphate (DAP) (■).

DETAILED DESCRIPTION

Before the present compositions and methods are described, it is to be understood that this invention is not limited to the particular processes, compositions, or methodologies described, as these may vary. It is also to be understood that the terminology used in the description is for the purpose of describing the particular versions or embodiments only, and is not intended to limit the scope of the present invention, which will be limited only by the appended claims. Unless defined otherwise, all technical and scientific terms used herein have the same meaning as commonly understood by one of ordinary skill in the art. Although any methods and materials similar or equivalent to those described herein can be used in the practice or testing of embodiments of the present invention, the preferred methods, devices, and materials are now described. All publications mentioned herein are incorporated by reference in their entirety. Nothing herein is to be construed as an admission that the invention is not entitled to antedate such disclosure by virtue of prior invention.

It must also be noted that as used herein and in the appended claims, the singular forms "a," "an," and "the" include plural reference unless the context clearly dictates otherwise. Thus, for example, reference to "a combustion chamber" is a reference to "one or more combustion chambers" and equivalents thereof known to those skilled in the art, and so forth.

As used herein, the term "about" means plus or minus 10% of the numerical value of the number with which it is being used. Therefore, about 50% means in the range of 45%-55%.

Embodiments of the invention are directed to mercury sorbents including an adsorptive material and ammonium-containing compound and no halogen containing component. Further embodiments are directed to methods for making such mercury sorbents, and still further embodiments are directed to methods for using the mercury sorbents for removal of heavy metals such as mercury from flue gas. The sorbents of the invention provide similar heavy metal adsorption to currently available sorbents without the use of halides, which were previously believed to be necessary for adequate mercury capture. The sorbents of such embodiments may provide good adsorption characteristics at lower cost than similar sorbents.

The adsorptive material may be any adsorptive material known in the art such as, for example, a carbonaceous char, activated carbon, carbon black, reactivated carbon, zeolite, silica, silica gel, alumina clay, or a combination thereof, and in some embodiments, the adsorptive material may be activated carbon, carbonaceous char, carbon black, or reactivated carbon. Such adsorptive materials may have any mean particle diameter (MPD). For example, in some embodiments, the MPD of the adsorptive material may be from about 0.1 µm to about 100 µm, and in other embodiments, the MPD may be about 1 µm to about 30 µm. In still other embodiments, the MPD of the adsorptive material may be less than about 15 µm, and in some particular embodiments, the MPD may be about 2 µm to about 10 µm, about 4 µm to about 8 µm, or about 5 µm or about 6 µm. In certain embodiments, the mercury sorbent may have an MPD of less than about 12 µm, or in some embodiments, less than 7 µm. In some embodiments, the mercury sorbent has a surface area of at least about 300 m²/g.

Embodiments are not limited to particular ammonium-containing compounds. In some embodiments, the ammonium-containing compound includes, for example, ammonium bicarbonate salts, ammonium phosphate salts, mixed salt ammonium phosphates, ammonium pyrophosphates, hydrogen ammonium phosphates, dihydrogen ammonium phosphates, and the like and combinations thereof. For example in various embodiments, the non-halogen ammonium-containing compound may be ammonium bicarbonate, ammonium carbonate, diammonium phosphate, mono-ammonium phosphate, ammonium chloride, ammonium pyrophosphate, urea-phosphate, urea, and combinations thereof.

The adsorptive material and the ammonium-containing compounds can be combined in any way. For example, in some embodiments, the additive mixture may be dispersed in a liquid and the sorbent may be contacted with the liquid to create an impregnated sorbent. Such impregnation processes are well known in the art and produce sorbents in which the additive is dispersed on, or otherwise physically associated, with outer surfaces and within the pores of sorbent material.

In other embodiments, the adsorptive material with an additive mixture may be co-ground to produce a sorbent that is a dry admixture of adsorptive material and additives. In such dry admixtures, the adsorptive material and the additives of the additive mixture are separate and distinct particles having similar particle diameters that are not physically associated with one another. Thus, the morphology of the dry admixture sorbents is different than impregnated sorbents.

The mercury sorbents in a dry admixture may have any mean particle diameter (MPD) of from about 0.1 µm to about 100 µm, and in other embodiments, the MPD may be about 1 µm to about 30 µm. In still other embodiments, the MPD of the mercury sorbent may be less than about 15 µm, and in some particular embodiments, the MPD may be about 2 µm to about 10 µm, about 4 µm to about 8 µm, or about 5 µm or about 6 µm. In certain embodiments, the mercury sorbent may have an MPD of less than about 12 µm, or in some embodiments, less than 7 µm. In some embodiments, increased selectivity for mercury adsorption over sulfur trioxide adsorption may be provided by co-milling activated carbon with an additive mixture to an MPD of less than about 10 µm or less than about 7 µm. Although not wishing to be bound by theory, the small MPD may improve the selectivity of mercury adsorption as the halogen effectively oxidizes the mercury and the alkalinity interferes with the adsorption of the sulfur trioxide.

The total amount of ammonium-containing compound may vary among embodiments and may vary depending on the use of the mercury sorbent. For example, in various embodiments, the total amount may be about 0.5 wt. % to about 40 wt. % of the based on the total weight of the sorbent, and in certain embodiments, the additive mixture may be about 1 wt. % to about 30 wt. %, about 10 wt. % to about 30 wt. %, about 20 wt. % to about 30 wt. %, or any range or individual weight percentage within these ranges. In further embodiments, the total amount of ammonium-containing compound may be greater than or equal to about 0.30 equivalents per 100 grams of the mercury sorbent.

In some embodiments, an alkaline additive may be included in the sorbent composition, and such alkaline agents may act as an acid gas or $SO_x$ suppression agent. Numerous alkaline agents are known in the art and currently used and any such alkaline agent may be used in the invention. For example, in various embodiments, the alkaline additive may be alkali oxides, alkaline earth oxides, hydroxides, carbonates, bicarbonates, phosphates, silicates, aluminates, and combinations thereof, and in certain embodiments, the alkaline additive may be calcium carbonate ($CaCO_3$; limestone), calcium oxide (CaO; lime), calcium hydroxide ($Ca(OH)_2$; slaked lime); magnesium carbonate ($MgCO_3$; dolomite), magnesium hydroxide ($Mg(OH)_2$), magnesium oxide (MgO), sodium carbonate ($Na_2CO_3$), sodium bicarbonate ($NaHCO_3$), trisodium hydrogendicarbonate dihydrate ($Na_3H(CO_3)_2 \cdot 2H_2O$; trona), and the like and combinations thereof. In various embodiments, the alkaline additive may be provided at a concentration greater than or equal to about 0.15 equivalents per 100 grams of mercury sorbent, wherein one equivalent of the alkaline additive is defined as the amount required to produce one mole of hydroxyl ions or to react with one mole of hydrogen ions. In particular embodiments, such alkaline additive may have a relatively high surface area such as, for example, above 100 $m^2/g$ for neat materials. Because alkaline additives are highly polar materials that may associate and bond with water, in various embodiments, alkaline agents may be combined with the primary mercury sorbent as a physical admixture. The mercury sorbent may include from about 10 wt. % to about 70 wt. %, about 10 wt. % to about 60 wt. %, or about 10 wt. % to about 50 wt. % alkaline additive or about 15 wt. % to about 70 wt. %, about 15 wt. % to about 60 wt. %, or about 15 wt. % to about 50 wt. % alkaline additive or about 20 wt. % to about 70 wt. %, about 20 wt. % to about 60 wt. %, or about 20 wt. % to about 50 wt. % alkaline additive.

The mercury sorbent, ammonium-containing compound, and when present, alkaline additive may be combined by any method. For example, in some embodiments, the mercury sorbent ammonium-containing compound, and in some embodiments, alkaline additive may be combined by physically mixing, blending, or grinding the materials into a single mercury sorbent that can then be injected into a flue gas stream. In some embodiments, the adsorptive material, ammonium-containing compound, and when present, alkaline additive can be ground to a powder form separately and then the powders are physically blended. Thereafter, the powder admixture can be injected into a common air stream, such as into the flue gas, or by use of other means. In other embodiments, combining may occur during use such that the adsorbent material, ammonium-containing compound, and in certain embodiments, alkaline additive may be held in different reservoirs and injected simultaneously into a flue gas stream. Alternatively, the admixture can be employed as a fixed bed.

In certain embodiments, the adsorptive material, ammonium-containing compound, and when present, alkaline additive may be co-milled. For example, in various embodiments, an adsorptive material, ammonium-containing compound, and in some embodiments, alkaline additive mixture may be combined and co-milled or sized to about the same particle size distribution which in some embodiments, may be a mean particle diameter of less than or equal to about 12 µm less than or equal to about 10 µm, or less than about 7 µm. Sorbent compositions have been shown to be particularly effective when all of the components of the mercury sorbent are combined and co-milled or otherwise sized to a MPD of less than or equal to about 12 µm. Co-milling may be carried out by any means. For example, in various embodiments, the co-milling may be carried out using bowl mills, roller mills, ball mills, jet mills or other mills or any grinding device known to those skilled in the art for reducing the particle size of dry solids.

The mercury sorbent of such embodiments may include any of the adsorptive materials described above, any non-halogen ammonium-containing compound described above, and in some embodiments, any alkaline additive described above. In certain embodiments, the adsorptive material may be an activated carbon, carbon black, or reactivated carbon, and the non-halogen ammonium-containing compound may be diammonium phosphate.

Further embodiments are directed to methods for removing mercury from flue gas by injecting a mercury sorbent including an adsorptive material and a non-halogen ammonium-containing compound into a flue gas stream. In some embodiments, the adsorptive material and non-halogen ammonium-containing compound can be injected into the flue gas stream individually. In particular embodiments, each of the adsorptive material and the non-halogen ammonium-containing compound may be injected into the flue gas through different ports at different locations in the flue gas stream. For example, the non-halogen ammonium-containing compound and adsorptive material can be injected at different locations upstream of the boiler. In other embodiments, the adsorptive material and non-halogen ammonium-containing compound can be injected at the same location in the flue gas stream through separate ports. In further embodiments, the adsorptive material and non-halogen ammonium-containing compound can be combined and injected simultaneously. For example, a mixture of adsorptive material and non-halogen ammonium-containing compound can be injected simultaneously through a single port. As such, the adsorptive material and the non-halogen ammonium-containing compound can be injected into the flue gas stream simultaneously.

The adsorptive material and non-halogen ammonium-containing compound or various mixtures of these components can be injected anywhere in the flue gas stream from the boiler to the particulate control device. In particular embodiments, at least the adsorptive material may be injected before (upstream) of the air preheater. The non-halogen ammonium-containing compound can be injected at the same location (i.e., before the air preheater) or a different location in the flue gas stream (i.e., upstream or downstream of the air preheater).

The mercury sorbents described herein can be used to adsorb mercury in any flue gas streams, including for example flue gas streams containing $SO_3$ or other acid gases such as HCl, HF, or $NO_x$ species. In some embodiments, such mercury sorbents may be advantageous in flue gas streams that contain both native $SO_3$, i.e. $SO_3$ generated directly from the combustion of the fuel, and/or $SO_3$ that is purposely injected for the sake of flue gas conditioning. In certain embodiments, the mercury sorbents described above may be used in combination with the halogen containing additives or halogen containing adsorptive materials.

The ability to enhance the mercury removal performance of activated carbons without the use of halogen containing additives such as bromide additives by using ammonia releasing additives instead imparts a number of advantages. Firstly, the cost of an additive such as diammonium phosphate is substantially lower than that of bromide compounds. Secondly, there are known to be coal-fired units with flue gas streams that contain a high fraction of oxidized mercury as well as ppm levels of $SO_3$. The use of the mercury sorbents described herein will afford superior performance versus those that do not contain ammonia releasing additives, while avoiding the introduction of any additional halogen that necessarily happens with the use of brominated carbons. This will help to avoid bromide based corrosion of steel surfaces as well as increases in bromide levels in plant wastewater effluent which can ultimately lead to increased levels of toxic trihalomethanes in the drinking water of municipalities downstream of such effluents.

EXAMPLES

Although the present invention has been described in considerable detail with reference to certain preferred embodiments thereof, other versions are possible. Therefore the spirit and scope of the appended claims should not be limited to the description and the preferred versions contained within this specification. Various aspects of the present invention will be illustrated with reference to the following non-limiting examples.

Example 1

A 5 MW equivalent pilot scale test facility, the Mercury Research Center (MRC), that pulled a slipstream of flue gas from unit 5 at plant Crist was used to test the compositions described above. Crist unit 5 fired blends of bituminous coals that contained appreciable levels of sulfur (at least ≥0.5 wt. %) and produced ppm levels of native $SO_3$. FIG. 1 shows a plot of the results generated with two different carbon samples from two different days while the unit was firing the same blend of coals.

Surprisingly, a formulation containing 30 wt. % diammonium phosphate (DAP) and no bromide salt was observed to outperform a formulation containing both 10 wt. % potassium chloride (KCl) and 20 wt. % sodium bromide (NaBr). Both formulations were ground to the same particle size and contained the same virgin carbon feedstock. Thus, the formulation containing DAP and no bromide appears to have outperformed the bromide containing sample. This effect could be the result of the release of ammonia upon injection to mitigate $SO_3$ impact.

What is claimed is:

1. A mercury sorbent comprising:
an adsorptive material; and
a non-halogen ammonium-containing compound,
wherein the mercury sorbent has no halogen component and is a dry admixture that includes separate and distinct particles of adsorptive material and non-halogen ammonium-containing compound having similar particle diameters, and the non-halogen ammonium-containing compound is not dispersed by liquid impregnation on the outer surfaces or within the pores of the adsorptive material.

2. The mercury sorbent of claim 1, wherein the non-halogen ammonium-containing compound is selected from the group consisting of ammonium bicarbonate salts, ammonium phosphate salts, mixed salt ammonium phosphates, ammonium pyrophosphates, hydrogen ammonium phosphates, dihydrogen ammonium phosphates, urea-phosphate, urea, and combinations thereof.

3. The mercury sorbent of claim 1, wherein the mercury sorbent comprises about 1 wt. % to about 20 wt. % non-halogen ammonium-containing compound based on the total weight of the mercury sorbent.

4. The mercury sorbent of claim 1, further comprising an alkaline additive.

5. The mercury sorbent of claim 4, wherein the alkaline additive is selected from the group consisting of calcium carbonate, calcium oxide, calcium hydroxide; magnesium carbonate, magnesium hydroxide, magnesium oxide, sodium carbonate, sodium bicarbonate, trisodium hydrogendicarbonate dihydrate, and combinations thereof.

6. The mercury sorbent of claim 1, wherein the mercury sorbent has a mean particle diameter of about 1 μm to about 30 μm.

7. The mercury sorbent of claim 1, wherein the adsorptive material is selected from the group consisting of carbonaceous char, activated carbon, carbon black, reactivated carbon, zeolite, silica, silica gel, alumina clay, and combinations thereof.

8. The mercury sorbent of claim 1, where the adsorptive material and the non-halogen ammonium-containing compound are co-ground to produce the dry admixture that is mixed dry.

9. A method for removing mercury from flue gas comprising:
injecting a mercury sorbent having no halogen containing component comprising an adsorptive material and a non-halogen ammonium-containing compound into the flue gas, wherein the mercury sorbent is a dry admixture that is mixed dry and includes separate and distinct particles of adsorptive material and non-halogen ammonium-containing compound having similar particle diameters, and the non-halogen ammonium-containing compound is not dispersed by liquid impregnation on the outer surfaces or within the pores of the adsorptive material.

10. The method of claim 9, wherein the non-halogen ammonium-containing compound is selected from the group consisting of ammonium bicarbonate salts, ammonium phosphate salts, mixed salt ammonium phosphates, ammonium pyrophosphates, hydrogen ammonium phosphates, dihydrogen ammonium phosphates, urea-phosphate, urea, and combinations thereof.

11. The method of claim 9, wherein the mercury adsorbent comprises about 1 wt. % to about 20 wt. % non-halogen ammonium-containing compound based on the total weight of the mercury sorbent.

12. The method of claim 9, wherein the mercury adsorbent further comprises an alkaline additive.

13. The method of claim 12, wherein the alkaline additive is selected from the group consisting of calcium carbonate, calcium oxide, calcium hydroxide; magnesium carbonate, magnesium hydroxide, magnesium oxide, sodium carbonate, sodium bicarbonate, trisodium hydrogendicarbonate dihydrate, and combinations thereof.

14. The method of claim 9, wherein the mercury sorbent has a mean particle diameter of about 1 μm to about 30 μm.

15. The method of claim 9, wherein the adsorptive material is selected from the group consisting of carbonaceous char, activated carbon, carbon black, reactivated carbon, zeolite, silica, silica gel, alumina clay, and combinations thereof.

16. The method of claim 9, wherein the adsorptive material and non-halogen ammonium-containing compound are injected simultaneously.

17. The method of claim 9, wherein the adsorptive material and non-halogen ammonium-containing compound are injected individually.

18. The method of claim 9, wherein the adsorptive material is injected upstream of the air preheater.

19. The method of claim 18, wherein the non-halogen ammonium-containing compound is injected upstream of the air preheater.

20. The method of claim 18, wherein the non-halogen ammonium-containing compound is injected downstream of the air preheater.

21. The method of claim 9, where the adsorptive material and the non-halogen ammonium containing compound are co-ground to produce the dry admixture that is mixed dry.

* * * * *